United States Patent
Shin et al.

(10) Patent No.: US 9,495,030 B2
(45) Date of Patent: Nov. 15, 2016

(54) LIQUID CRYSTAL DISPLAY DEVICE COMPRISING TOUCH SCREEN

(75) Inventors: Jae Hun Shin, Goyang-si (KR); Byung Koo Kang, Paju-si (KR); Moon Bong Song, Seoul (KR); Shi Cheol Song, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 481 days.

(21) Appl. No.: 13/312,500

(22) Filed: Dec. 6, 2011

(65) Prior Publication Data

US 2012/0218198 A1    Aug. 30, 2012

(30) Foreign Application Priority Data

Feb. 28, 2011   (KR) .................. 10-2011-0017875

(51) Int. Cl.
*G02F 1/1333* (2006.01)
*G06F 3/044* (2006.01)
*G06F 3/041* (2006.01)

(52) U.S. Cl.
CPC ......... *G06F 3/0412* (2013.01); *G02F 1/13338* (2013.01); *G06F 3/044* (2013.01)

(58) Field of Classification Search
CPC .................................................. G02F 1/13338
USPC ........................................................ 349/12
See application file for complete search history.

(56) References Cited

U.S. PATENT DOCUMENTS

| | | | |
|---|---|---|---|
| 7,038,740 B1* | 5/2006 | Katsuya .......................... | 349/38 |
| 2008/0158183 A1* | 7/2008 | Hotelling et al. ............. | 345/173 |
| 2009/0107736 A1* | 4/2009 | Ben-Eliyahu et al. ..... | 178/18.01 |
| 2010/0026662 A1* | 2/2010 | Oohira .......................... | 345/174 |
| 2010/0097344 A1* | 4/2010 | Verweg ......................... | 345/174 |
| 2010/0120473 A1* | 5/2010 | Oh ................................. | 455/566 |
| 2010/0296034 A1* | 11/2010 | Kim .............................. | 349/110 |

OTHER PUBLICATIONS

J.L. Huang, B.S. Yau, C.Y. Chen, W.T. Lo, D.F. Lii, The electromagnetic shielding effectiveness of indium tin oxide films, 2001, Ceramics International, vol. 27, Issue 3, pp. 363-365.*

* cited by examiner

*Primary Examiner* — Nathanael R Briggs
*Assistant Examiner* — Alexander Gross
(74) *Attorney, Agent, or Firm* — Birch, Stewart, Kolasch & Birch, LLP

(57) ABSTRACT

Discussed is an LCD device including a touch screen which reduces the influence of noise applied to the touch screen by driving of a liquid crystal panel and thus leads to enhancement of the touch sensing performance. The LCD device includes a liquid crystal panel, a plurality of first touch electrodes, an insulation unit, a tempered glass, and a plurality of second touch electrodes. The liquid crystal panel includes a lower substrate and an upper substrate. The first touch electrodes are formed on the upper substrate for detecting a touch point in a first direction. The insulation unit is formed on the first touch electrodes. The tempered glass is formed on the insulation unit. The second touch electrodes are formed at a lower surface of the tempered glass for detecting a touch point in a second direction.

15 Claims, 11 Drawing Sheets

LIQUID CRYSTAL DISPLAY DEVICE COMPRISING TOUCH SCREEN

CROSS-REFERENCE TO RELATED APPLICATIONS

This application claims the benefit of the Korean Patent Application No. 10-2011-0017875 filed on Feb. 28, 2011, which is hereby incorporated by reference as if fully set forth herein.

BACKGROUND

1. Field of the Invention

The present invention relates to a Liquid Crystal Display (LCD) device, and more particularly, to an LCD device including a touch screen which reduces the influence of noise applied to the touch screen by driving of a liquid crystal panel and thus leads to enhancement of the touch sensing performance.

2. Discussion of the Related Art

With the advance of various portable electronic devices such as mobile communication terminals and notebook computers, the demands of Flat Panel Display (FPD) devices applicable to the portable electronic devices are increasing.

Liquid Crystal Display (LCD) devices, Plasma Display Panels (PDPs), Field Emission Display (FED) devices, and Light Emitting Diode (LED) display devices have been developed as FPD devices.

In such FPD devices, the application fields of LCD devices are being expanded because the LCD devices are easily manufactured and have drivability of drivers, low power consumption, thin thickness, high image quality and a large screen.

Touch screens, which replace the existing input devices such as mouses or keyboards and enable a user to directly input information by finger and pen, are being applied as the input devices of LCD devices.

Touch screens can be easily manipulated by all users, and thus, the applications of the touch screens are being expanded.

Such touch screens are categorized into the following types according to structures thereof. An in-cell type where a touch screen is built in a cell of a liquid crystal panel. An on-cell type where a touch screen is disposed at an upper portion of a liquid crystal panel. An add-on type where a touch screen is separately coupled to an upper portion of an LCD device.

FIG. 1 is a view illustrating a related art LCD device with an on-cell type touch screen applied thereto. FIG. 2 is a view illustrating the structure of the touch screen of FIG. 1.

Referring to FIGS. 1 and 2, the related art LCD device with the on-cell type touch screen applied thereto includes a backlight unit 10, a liquid crystal panel 20, a lower polarizer 30, an upper polarizer 40, a touch screen 50, and a protective film 60 (or a protective glass).

The liquid crystal panel 20 includes a lower substrate 22 and an upper substrate 24 that are coupled to each other with a liquid crystal layer (not shown) therebetween.

A plurality of pixels are formed in a matrix type, at the lower substrate 22.

Red, green, and blue color filters are formed in a matrix type, at the upper substrate 24.

The lower polarizer 30 is disposed at a lower portion of the liquid crystal panel 20, and the upper polarizer 40 is disposed at an upper portion of the liquid crystal panel 20.

Herein, the backlight unit 10 includes a light source 12 that emits light, a light guide panel 14, and a plurality of optical sheets 16.

The light guide panel 14 guides light, supplied from the light source 12, toward the liquid crystal panel 20. The optical sheets 16 enhance the efficiency of light that is outputted from the light guide panel 14 and is incident on the liquid crystal panel 20.

The touch screen 50, as illustrated in FIG. 2, includes a plurality of first touch electrodes 52 that are formed in an X-axis direction, and a plurality of second touch electrodes 54 that are formed in a Y-axis direction.

The first touch electrodes 52 and the second touch electrodes 54 are formed on the upper substrate 24 of the liquid crystal panel 20. A plurality of insulation layers are respectively disposed in a plurality of regions where the first touch electrodes 52 intersect the second touch electrodes 54, and form a bridge. The first and second touch electrodes 52 and are insulated from each other by the bridge.

A signal (voltage) for detecting a touch is applied to the first touch electrode 52.

When a user touches a specific point of a display screen (touch screen panel) by finger or pen, a capacitance between the first and second touch electrodes 52 and 54 is changed by the user's touch.

A touch sensing driver, which is prepared separately, senses the change of the capacitance between the first and second touch electrodes 52 and 54, thereby sensing a touch point.

In the related art LCD device including the on-cell type touch screen, the first and second touch electrodes 52 and 54 for sensing a touch are formed of indium tin oxide (ITO) on the upper substrate 24 with the color filters formed therein and thus configure the touch screen.

The liquid crystal panel 20 adjusts an amount of transmitted light by pixel unit with electric fields that are generated in the pixels, and thus displays a color image. At this point, a current in each pixel is changed by driving of a screen, causing noise such as an electromagnetic wave.

The first touch electrode 52 (X-axis touch electrode) and second touch electrode 54 (Y-axis touch electrode) of the touch screen 50 are formed on the upper substrate 24, and consequently affected by noise that occurs in the liquid crystal panel 20.

Particularly, a capacitive type touch screen is vulnerable to the noise. In the on-cell type touch screen 50, since the two touch electrodes 52 and 54 are formed on the upper substrate 24 close to the lower substrate 22 with thin film transistors formed therein, the on-cell type touch screen 50 is more affected by noise.

As described above, due to characteristic of the stack-up structure of the touch screen 50 formed on the upper substrate 24 of the liquid crystal panel 20, the touch screen 50 is vulnerable to noise that is caused by driving of the liquid crystal panel 20, and consequently touch sensing performance is degraded.

Recently, LCD devices including a touch screen are being increasingly applied to mobile devices such as portable phones and smart phones. Design, communication quality, and touch sensing performance are becoming factors important for purchasing mobile devices.

Therefore, all manufacturers are researching technology for enhancing the touch sensing performance of the on-cell type touch screen, but technology for innovatively enhancing the touch sensing performance is not developed up to date.

Moreover, to decrease the influence of noise due to driving of the liquid crystal panel 20, the design of the touch screen 50 is required to be changed, but the related art has limitations in changing the design of the touch screen 50 for reducing the influence of noise.

Furthermore, a touch sensing driver robust to noise is required to be applied to touch screens. However, the touch sensing driver robust to noise is restrictively applied to some products, and the cost increases in applying the touch sensing driver.

SUMMARY

Accordingly, the present invention is directed to provide an LCD device including a touch screen that substantially obviates one or more problems due to limitations and disadvantages of the related art.

An aspect of the present invention is to provide an LCD device including a touch screen, which reduces the influence of noise due to driving of a screen, thus leading to enhancement of the touch sensing performance.

Another aspect of the present invention is to provide an LCD device including a touch screen, which leads to the enhancement of the touch sensing performance and the increase in freedom of the design of the touch screen.

Another aspect of the present invention is to provide an LCD device including a touch screen, which enables the saving of the manufacturing cost by enhancing the touch sensing performance.

In addition to the aforesaid objects of the present invention, other features and advantages of the present invention will be described below, but will be clearly understood by those skilled in the art from descriptions below.

To achieve these and other advantages and in accordance with the purpose of the invention, as embodied and broadly described herein, there is provided an LCD device with a touch screen including: a liquid crystal panel including a lower substrate and an upper substrate; a plurality of first touch electrodes formed on the upper substrate for detecting a touch point in a first direction; an insulation means formed on the first touch electrodes; a tempered glass formed on the insulation means; and a plurality of second touch electrodes formed at a lower surface of the tempered glass for detecting a touch point in a second direction, wherein the first touch electrodes and the second touch electrodes are separated from each other at certain intervals by the insulation means.

In another aspect of the present invention, there is provided an LCD device with a touch screen including: a liquid crystal panel including an upper substrate with a plurality of color filters formed therein, and a lower substrate in which a thin film transistor is formed in each of a plurality of pixels; a lower polarizing film formed at a lower portion of the liquid crystal panel; an upper polarizing film formed at an upper portion of the liquid crystal panel; a plurality of first touch electrodes formed at a lower surface of the upper polarizing film, for detecting a touch point in a first direction; a tempered glass formed on the upper polarizing film; and a plurality of second touch electrodes formed at a lower surface of the tempered glass, for detecting a touch point in a second direction, wherein the first touch electrodes and the second touch electrodes are separated from each other at intervals of about 100 µm to about 150 µm by the upper polarizing film, and the first touch electrodes are formed to have an area broader than the second touch electrodes.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, an LCD device including a touch screen according to embodiments of the present invention will be described with reference to the accompanying drawings.

In description of embodiments of the present invention, when a structure (for example, an electrode, a line, a wiring, a layer, or a contact) is described as being formed at an upper portion/lower portion of another structure or on/under the other structure, this description should be construed as including a case where the structures contact each other and moreover a case where a third structure is disposed therebetween.

Figure 1:
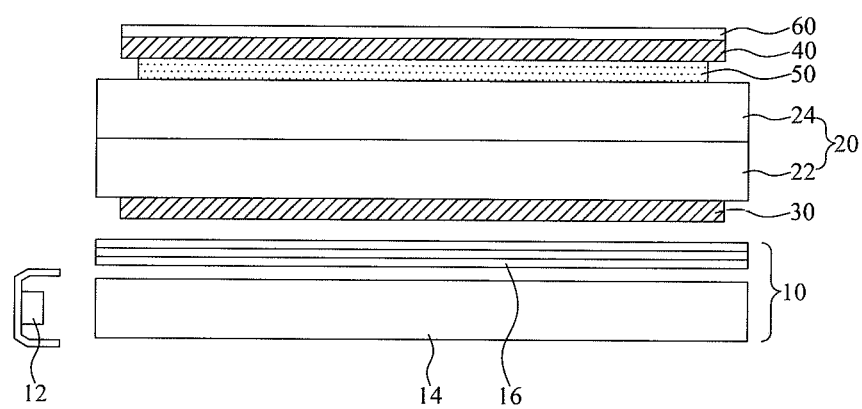
FIG. 1 is a view illustrating a related art LCD device with an on-cell type touch screen applied thereto.
Figure 2:
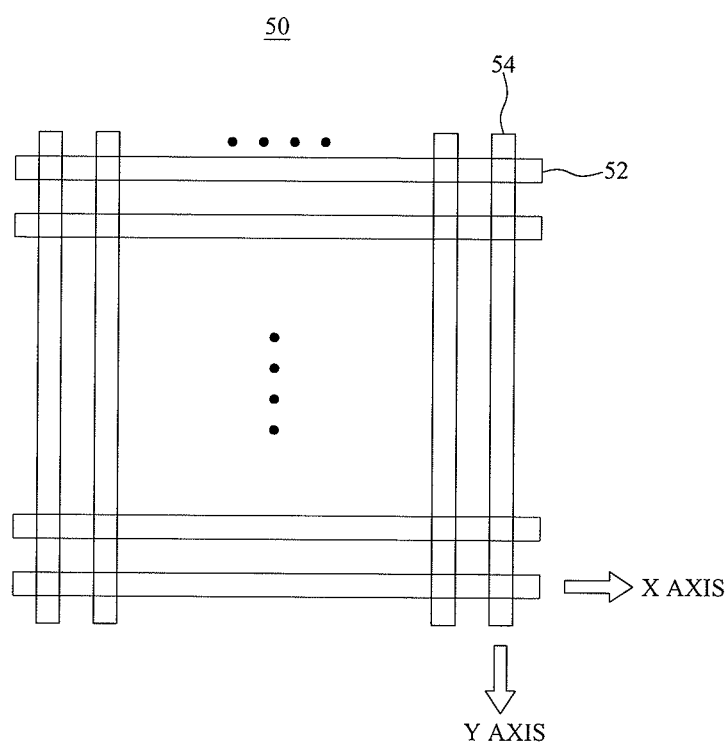
FIG. 2 is a view illustrating the structure of the touch screen of FIG. 1.
Figure 3:
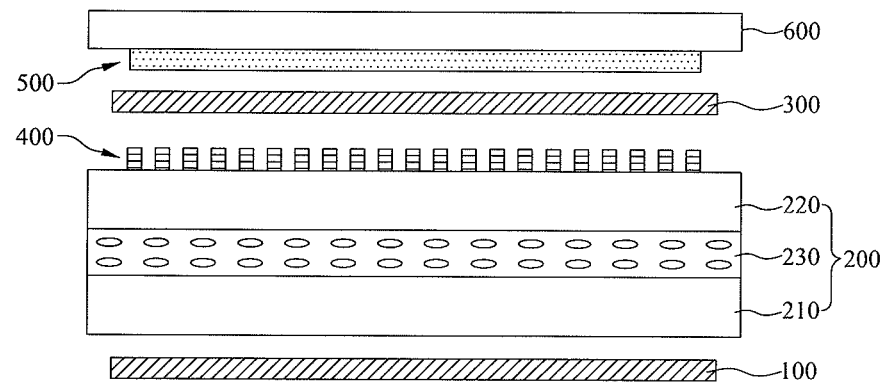
FIGS. 3 and 4 are views illustrating an LCD device including a touch screen according to an embodiment of the present invention.
Figure 4:
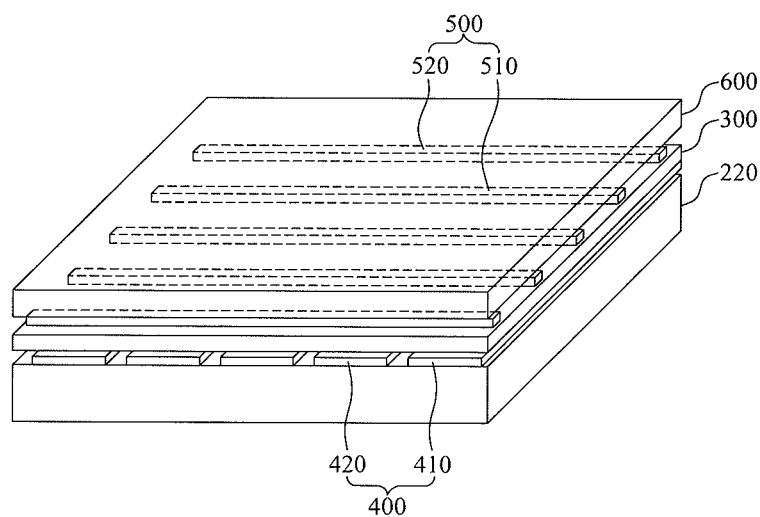

FIGS. 3 and 4 are views illustrating an LCD device including a touch screen according to an embodiment of the present invention. FIGS. 3 to 8 are views illustrating a stack-up structure of a touch screen according to an embodiment of the present invention.

Referring to FIGS. 3 and 4, an LCD device including a touch screen according to an embodiment of the present invention includes a lower polarizing film 100, a liquid crystal panel 200, an upper polarizing film 300, a first touch electrode layer 400, a second touch electrode layer 500, and a tempered glass 600.

Moreover, the LCD device including the touch screen according to an embodiment of the present invention includes a backlight unit that supplies light to the liquid crystal panel 200, a driving circuit for driving the liquid crystal panel 200, and a touch sensing driver for sensing a user's touch point. In FIGS. 3 and 4, the backlight unit and the driving circuit are not illustrated.

The driving circuit includes a timing controller (T-con), a data driver (D-IC), a gate driver (G-IC), a backlight driver, and a power supply that supplies a driving power thereto.

The timing controller converts input video signals (data) into digital image data (RGB) by frame unit with an input timing signal (TS) and supplies the digital image data, aligned by frame unit, to the data driver. Herein, the timing signal (TS) includes a vertical sync signal Vsync, a horizontal sync signal Hsync, and a clock signal CLK.

Moreover, the timing controller generates a gate control signal (GCS) for controlling the gate driver and a data control signal (DCS) for controlling the data driver with the vertical sync signal Vsync, horizontal sync signal Hsync, and clock signal CLK.

The gate control signal (GCS) generated by the timing controller is supplied to the gate driver, and the data control signal (DCS) is supplied to the data driver.

Herein, the data control signal (DCS) may include a source start pulse (SSP), a source sampling clock (SSC), a source output enable signal (SOE), and a polarity control signal (POL).

The gate control signal (GCS) may include a gate start pulse (GSP), a gate shift clock (GSC), and a gate output enable (GOE).

The gate driver generates a scan signal (gate driving signal) for driving a plurality of thin film transistors that are respectively formed in a plurality of pixels, on the basis of the gate control signal GCS from the timing controller.

The generated scan signal is sequentially supplied to a plurality of gate lines that are formed in the liquid crystal panel 200, for one frame duration. The thin film transistors are driven by the scan signal that are sequentially supplied to the gate lines, and thus allow the pixels to be switched.

The data driver includes a plurality of source drive ICs, and each of the source drive ICs converts the digital image data, supplied from the timing controller, into analog image data (i.e., data voltages).

On the basis of the data control signal (DCS) from the timing controller, the data driver respectively supplies data voltages for one horizontal line to a plurality of data lines that are formed in the liquid crystal panel 200, at a time when the thin film transistor of each sub-pixel is turned on.

The liquid crystal panel 200 adjusts the transmittance of light, which is supplied from the backlight unit (not shown) via the lower polarizing film 100, to display an image.

The liquid crystal panel 200 includes a lower substrate 210 where a plurality of pixels are defined in a matrix type, an upper substrate 220 where red, green, and red color filters are formed in a matrix type to correspond to each of the pixels, and a liquid crystal layer 230 that is disposed between the lower substrate 210 and the upper substrate 220.

Herein, the color filters may be formed to have a thickness of about 0.3 mm to about 0.5 mm.

A common electrode formed in each of the pixels of the liquid crystal panel 200. An electric field is generated in each pixel by a data voltage and a common voltage (Vcom) that are supplied to each pixel, and liquid crystal is aligned by the electric field, thereby controlling the transmittance of light in each pixel.

The liquid crystal panel 200 cannot self-emit light, and thus displays an image with light supplied from the backlight unit.

The backlight unit irradiates light on the liquid crystal panel 200, and includes a plurality of backlights that emit light and an optical member (for example, a light guide panel or an diffusion plate and a plurality of optical sheets).

Herein, one type light source of Cold Cathode Fluorescent Lamp (CCFL), External Electrode Fluorescent Lamp (EEFL), and Light Emitting Diode (LED) may be applied as the backlight, or two combined-type light sources of CCFL, EEFL, and LED may be applied as the backlight.

The backlight driver is an element that controls the driving (turn-on/off) of the backlight, and may control the turn-on/off time, duty, and luminance of the backlight on the basis of the backlight control signal.

The touch sensing driver senses the change of a capacitance, formed between a plurality of first touch electrodes configuring the first touch electrode layer 400 and a plurality of second touch electrodes configuring the second touch electrode layer 500, to sense the user's touch point.

At this point, the touch sensing driver is connected to the first touch electrode layer 400 to sense an X-axis touch point, and connected to the second touch electrode layer 500 to sense a Y-axis touch point.

Herein, the first touch electrode layer 400 may serve as a transmitting unit (Tx) that receives a sensing signal for detecting a touch point. The second touch electrode layer 500 may serve as a receiving unit (Rx) for sensing the change of a capacitance.

The first touch electrodes of the first touch electrode layer 400 serve as driving electrodes that receive the sensing signal for detecting a touch. The second touch electrodes of the second touch electrode layer 500 serve as sensing electrodes.

Figure 9:
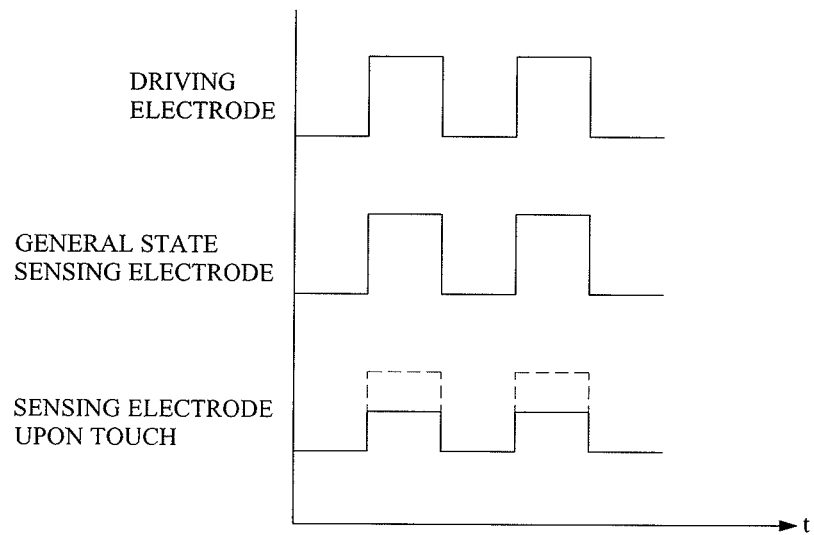
FIGS. 9 to 11 are views illustrating a touch sensing method of an LCD device including a touch screen, according to an embodiment of the present invention.

Referring to FIG. 9, touch sensing is performed by sensing the change of a signal when an input signal of a driving electrode is received by a sensing electrode through a touch sensor pattern. A reception signal is reduced in intensity when a touch is performed, compared to a reception signal when no touch.

Figure 10:
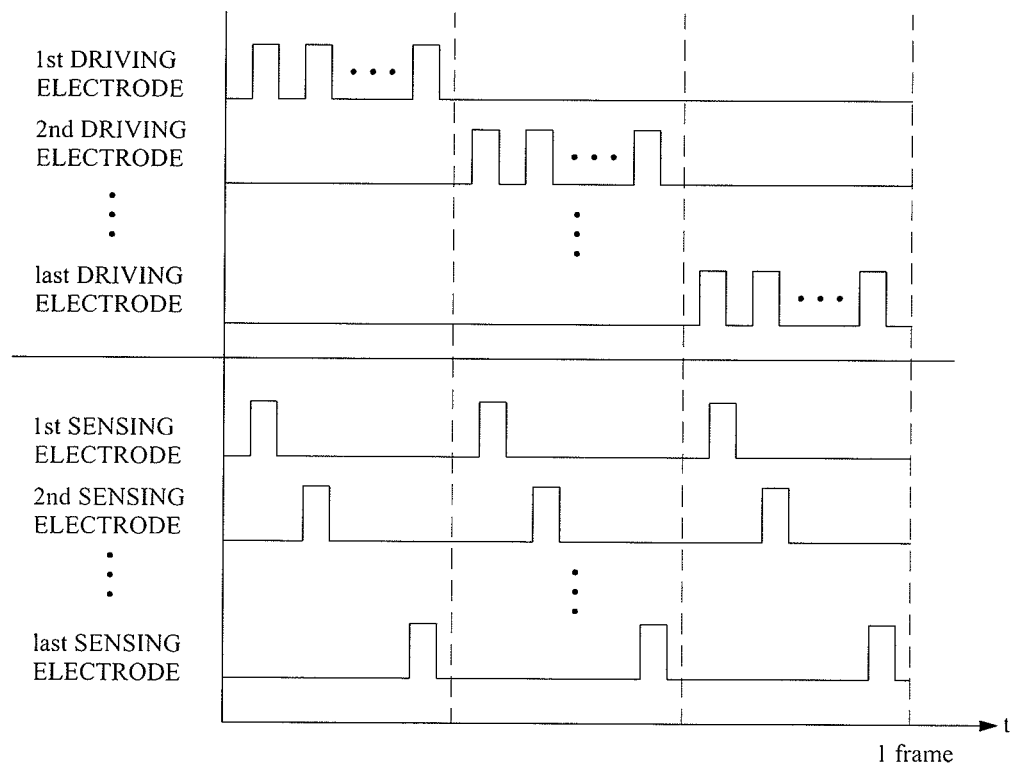

Referring to FIG. 10, in terms of a driving and receiving order, when a pulse is driven in a first driving electrode, the LCD device sequentially detects signals in an order from a first sensing electrode to a last sensing electrode to determine the presence of the user's touch.

Through the same scheme, the LCD device sequentially detects signals in an order from a first sensing electrode to a last sensing electrode, even in driving of a second driving electrode.

Identically to the above-described signal detecting scheme, the LCD device sequentially detects signals up to a last driving electrode and a last sensing electrode.

For one frame duration, when signals are sequentially detected from sensing electrodes in an order from a first driving electrode to a last driving electrode, the combination of driving and reception for all driving electrodes and sensing electrodes is made once.

In this case, a coordinate of a finger that has touched the touch screen panel may be obtained with positions of a driving electrode and sensing electrode when a touch is sensed.

Figure 11:
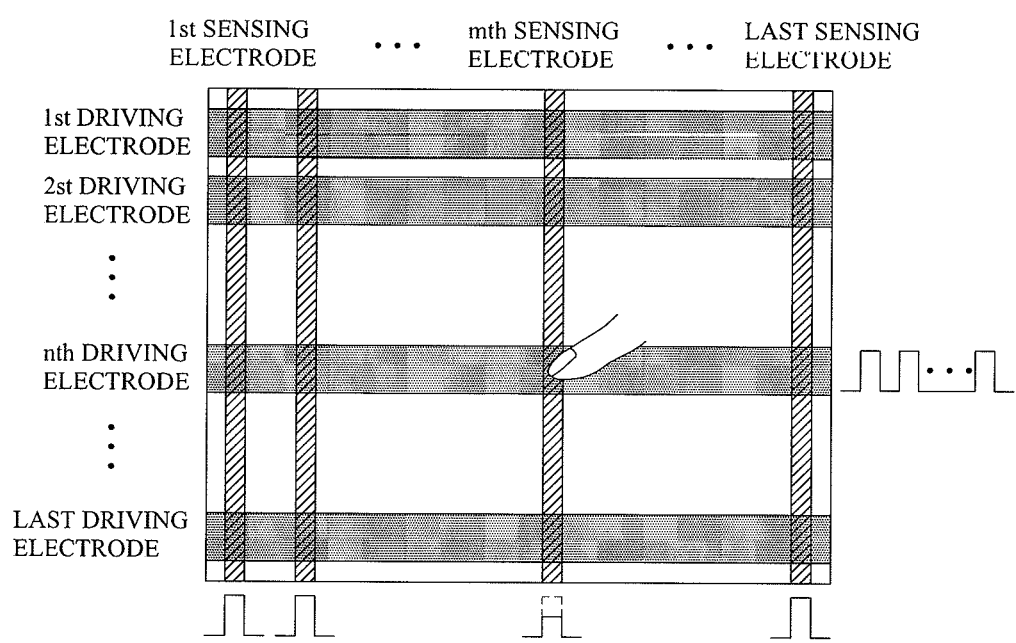

Referring to FIG. 11, when an mth driving electrode is driven, if a touch is sensed from an nth sensing electrode signal, an X-axis and Y-axis coordinate of a user touch is a point (m,m) where an mth driving electrode intersects an nth sensing electrode.

In the LCD device including the touch screen according to an embodiment of the present invention, the first and second touch electrode layers 400 and 500 are formed to be separated from each other by a certain distance.

Figure 5:
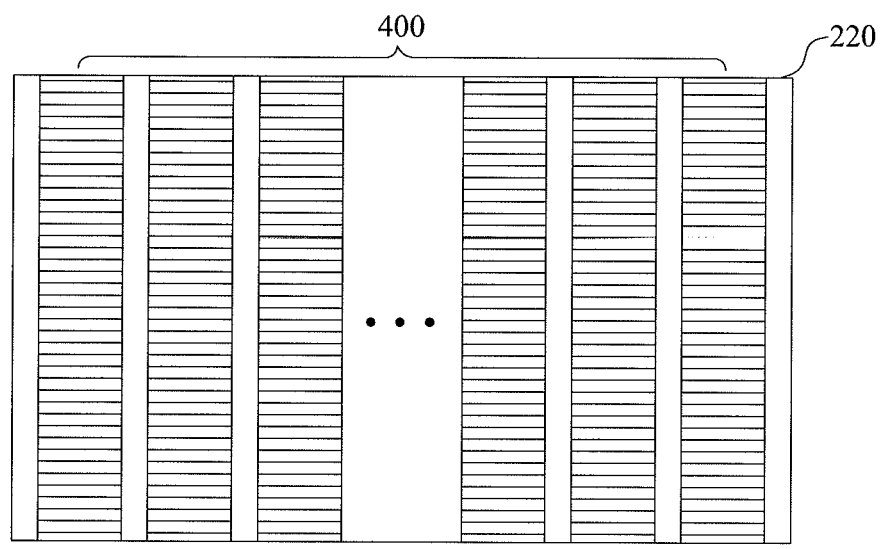
FIGS. 5 to 8 are views illustrating a stack-up structure of a touch screen according to an embodiment of the present invention.

Herein, as illustrated in FIGS. 4 and 5, the first touch electrode layer 400 is configured with a plurality of first and second touch electrodes 410 and 420.

The first touch electrodes 410 and 420 are formed of a transparent conductive material (having a high light transmittance) such as ITO, grapheme, or carbon nano tube (CNT).

The first touch electrodes 410 and 420 are patterned and formed to have a certain thickness and line width, on the upper substrate 220 with the color filters formed therein.

Figure 6:
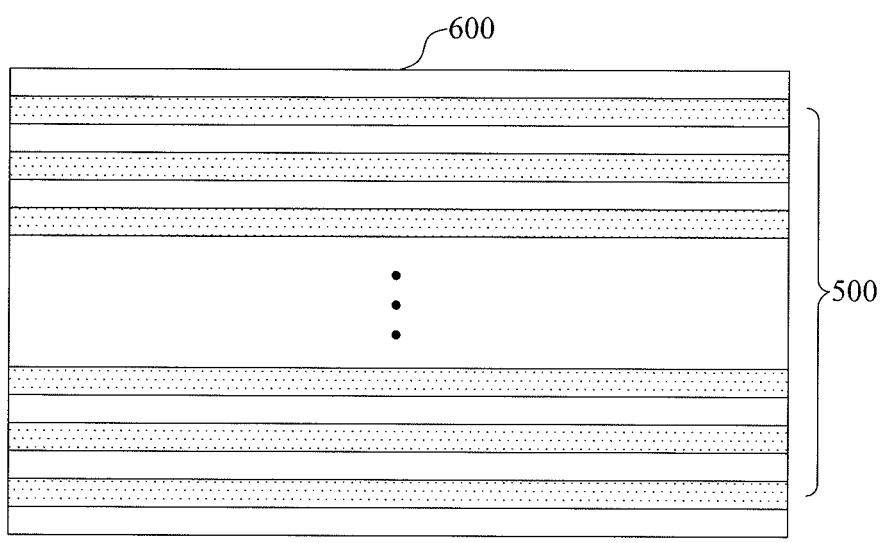

The second touch electrode layer 500, as illustrated in FIGS. 4 and 6, is configured with a plurality of second touch electrodes 510 and 520.

The second touch electrodes 510 and 520 are formed of a transparent conductive material (having a high light transmittance) such as ITO, grapheme, or carbon nano tube (CNT).

The second touch electrodes 510 and 520 are patterned and formed to have a certain thickness and line width, at a lower surface (rear surface) of the tempered glass 600 having a thickness of about 0.7 mm.

Herein, an insulation means formed of a nonconductive material is disposed between the first touch electrodes and the second touch electrodes. The insulation means allows X-axis and Y-axis touch sensing to be performed without the first touch electrodes contacting the second touch electrodes.

As an example of the present invention, the upper polarizing film 300 disposed at an upper portion of the liquid crystal panel 200 may be applied as the insulation means.

The upper substrate 220 with the first touch electrodes formed therein and a lower surface (rear surface) of the upper polarizing film 300 are adhered to each other with an adhesive (not shown). The tempered glass 600 with the second touch electrodes formed therein and an upper surface of the upper polarizing film 300 are adhered to each other with an adhesive (not shown).

Figure 7:
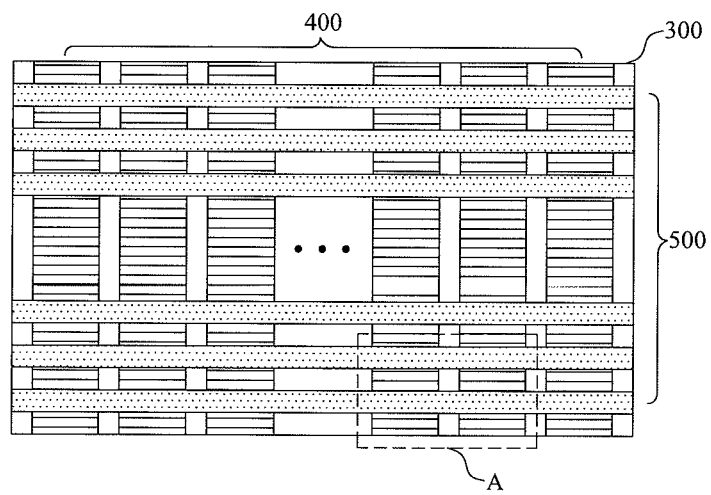
Figure 8:
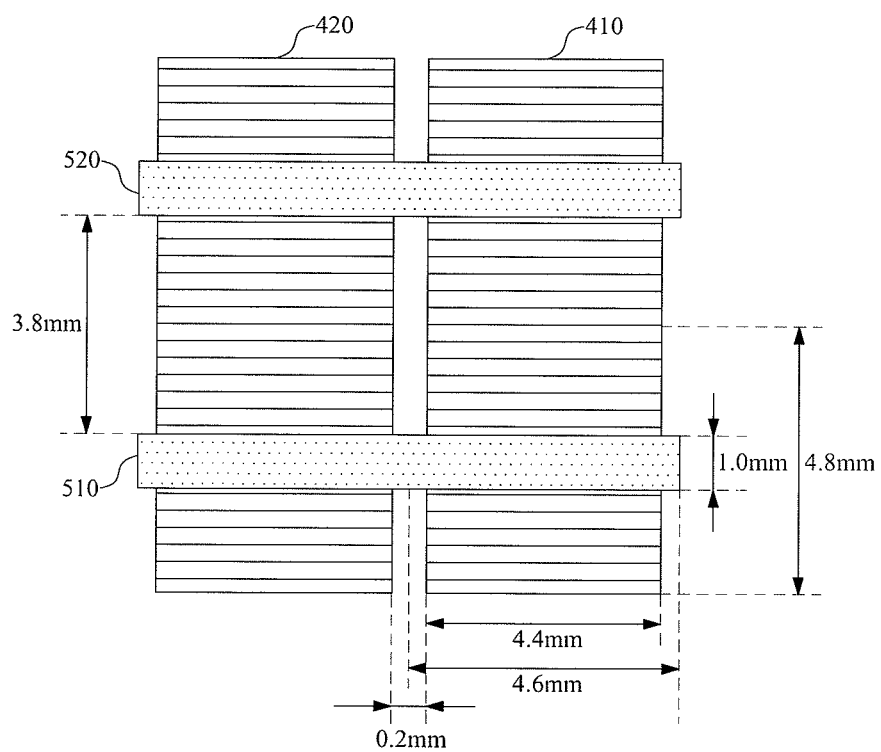

Referring to FIGS. 7 and 8, the first and second touch electrode layers 400 and 500 are formed to have an interval of about 20 μm with the upper polarizing film 300 therebetween.

As described above, the upper polarizing film 300 may be applied as an insulation layer between the first and second touch electrode layers 400 and 500.

The upper polarizing film 300 may be formed to have a thickness of about 100 μm to about 150 μm, for example, about 125 μm. Therefore, the first touch electrodes and the second touch electrodes are formed to be separated from each other by a distance of about 100 μm to about 150 μm, by the upper polarizing film 300.

FIG. 8 illustrates an enlarged portion A of FIG. 7.

Referring to FIG. 8, the first touch electrodes 410 and 420 and the second touch electrodes 510 and 520 may be formed to intersect each other. In FIG. 8, only two of the first touch electrodes 410 and 420 and two of the second touch electrodes 510 and 520 are illustrated.

As an example, the first touch electrodes may be formed in a Y-axis direction, and the second touch electrodes may be formed in an X-axis direction.

In another embodiment of the present invention, the first touch electrodes may be formed in an X-axis direction, and the second touch electrodes may be formed in a Y-axis direction.

Herein, the first touch electrodes and the second touch electrodes may be formed to have a thickness of an integer multiple of about 70 nm by using the interference effect of a thin film, for increasing the transmittance of visible light.

In an embodiment of the present invention, a thickness of the first touch electrodes and a thickness of the second touch electrodes may be about 140 nm.

The first touch electrodes and the second touch electrodes may be formed at 2:1 to 10:1 in line width. That is, the first touch electrodes may be formed to have a line width broader by twice to ten times than that of the second touch electrodes.

As an example, the first touch electrode of the first touch electrode layer 400 may be formed to have a line width of about 4.4 mm, and the second touch electrode of the second touch electrode layer 500 may be formed to have a line width of about 1.0 mm An interval between the first touch electrodes and an interval between the second touch electrodes may be formed at 1:10 to 1:30. That is, the interval between the second touch electrodes may be formed greater by ten times to thirty times than that between the first touch electrodes.

As an example, an interval between adjacent first touch electrodes may be about 0.2 mm, and an interval between adjacent second touch electrodes may be about 3.8 mm.

The first touch electrodes may be formed to occupy about 70% to about 90% of an entire area of the liquid crystal panel 200 (or a touch screen panel). The second touch electrodes may be formed to occupy about 5% to about 40% of an entire area of the liquid crystal panel 200 (or the touch screen panel).

Moreover, the first touch electrodes formed on the upper substrate 220 may be formed to overlap with about 70% to about 90% of an entire area of the second touch electrodes.

In the description that has been made above with reference to FIGS. 3 to 8, the first touch electrodes of the first touch electrode layer 400 have been described above as being formed on the upper substrate 220 with the color filters formed therein, but the embodiment is not limited thereto.

In another embodiment of the present invention, the first touch electrodes may be formed at a layer other than the upper substrate 220.

Figure 12:
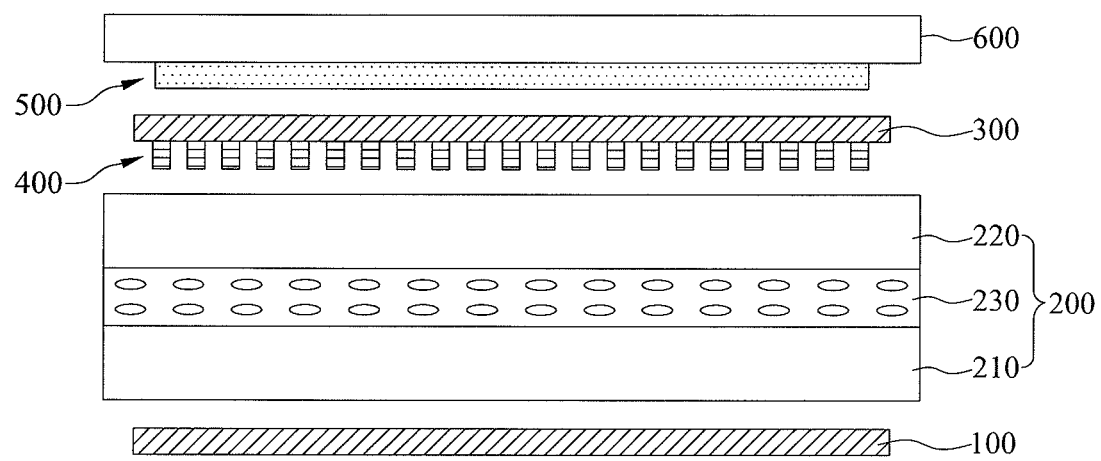
FIGS. 12 and 13 are views illustrating an LCD device including a touch screen according to another embodiment of the present invention.
Figure 13:
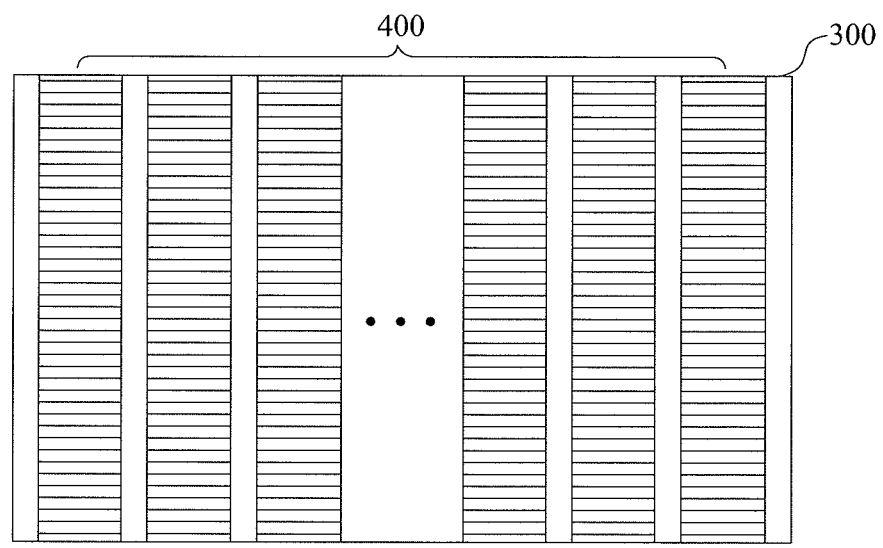

FIGS. 12 and 13 are views illustrating an LCD device including a touch screen according to another embodiment of the present invention.

Referring to FIGS. 12 and 13, the first touch electrode layer 400 that serves as a driving electrode may be formed at a lower surface (rear surface) of the upper polarizing film 300.

When the first touch electrodes are formed at the lower surface (rear surface) of the upper polarizing film 300, the line width and thickness of the first touch electrodes, an interval between adjacent first touch electrodes, and an area ratio of the first touch electrodes and second touch electrodes may be the same the embodiment of FIG. 8.

As an example, the first touch electrodes formed at the lower surface of the upper polarizing film 300 may have a thickness of an integer multiple of about 70 nm, for example, a thickness of about 140 nm. Furthermore, the first touch electrodes may be formed to have a line width broader by three times to six times than that of the second touch electrodes.

The first touch electrodes may occupy about 70% to about 90% of an entire area of the liquid crystal panel 200 (or the touch screen panel).

Moreover, the first touch electrodes may be formed to overlap with about 70% to about 90% of an entire area of the second touch electrodes.

In the LCD device including the touch screen according to the embodiments of the present invention, the first touch electrode being the driving electrode of the touch screen is formed on the upper substrate 220 of the liquid crystal panel 220, and the second touch electrode being the sensing electrode is formed at the lower surface (rear surface) of the tempered glass 600.

Through this, by widening an interval between the second touch electrode being the sensing electrode and the lower substrate 210 with the thin film transistors formed therein, the influence of noise that is caused by driving of the thin film transistors for displaying an image can be reduced on the second touch electrode being the sensing electrode. That is, the influence of noise due to driving of the liquid crystal panel 200 can be reduced on the touch screen.

On the basis of an experiment result of the touch sensing performance in FIGS. 14 to 17, the effects of the LCD device including the touch screen according to an embodiment of the present invention will be described below.

Before a description based on the drawings, noise that is applied to the touch screen by driving of the liquid crystal panel will be described below.

The LCD device changes the alignment state of liquid crystal disposed between the upper substrate and lower substrate to control the transmittance of light, thereby displaying a color image.

In order to change the alignment state of the liquid crystal, the LCD device periodically changes voltages that are respectively applied to the pixel electrode and common electrode of each pixel. An electromagnetic wave, namely, noise is caused by the change of the voltages, and consequently, a malfunction occurs in touch sensing of the touch screen that is disposed at the upper portion of the liquid crystal panel.

Particularly, when noise due to driving of the liquid crystal panel affects a sensing electrode (for example, the second touch electrodes that are formed at the lower surface of the tempered glass), the noise affects the sensing of the user's touch point.

In this case, there may be several paths through which the noise affects the touch screen. As a representative example, there may be a first path through which the noise directly affects the sensing electrode, and a second path through which the noise is absorbed into a driving electrode (for example, the first touch electrodes that are formed at the upper portion of the upper substrate) and then is transferred to a receiving electrode.

Therefore, the influence of the noise on the touch screen may be defined as the sum of a first noise (which is transferred through the first path) and a second noise that is transferred through the second path.

ITO, which is used as a material of the driving electrode and sensing electrode, is a conductive material and has an electric conductivity of about 5*104 mhos/m. When an electromagnetic wave bumps against a conductive material, the ITO shows three features of reflection, absorption, and transmission.

In an embodiment of the present invention, when the first touch electrodes and the second touch electrodes are formed of ITO, an electric conductivity (σ) is about 5*104 mhos/m.

The thickness of the first touch electrodes and the thickness of the second touch electrodes are designed as about 140 nm, and a magnetic permeability (μ) of ITO is designed as about 1.25*10-6 H/m. In this case, FIGS. 14 to 17 show an experiment result for preventing noise due to driving of the liquid crystal panel.

Herein, a frequency of the noise due to driving of the liquid crystal panel may be about several kHz to hundreds MHz. However, the experiment has been performed in a state where the frequency of the noise has been set as about 50 MHz.

According to the experiment result that has been obtained under the conditions, electromagnetic wave absorptivity, reflectivity, and transmissivity by indium tin oxide (ITO) are about 0.0248%, about 99.9751%, and about 7.86*10-5%, respectively.

Figure 14:
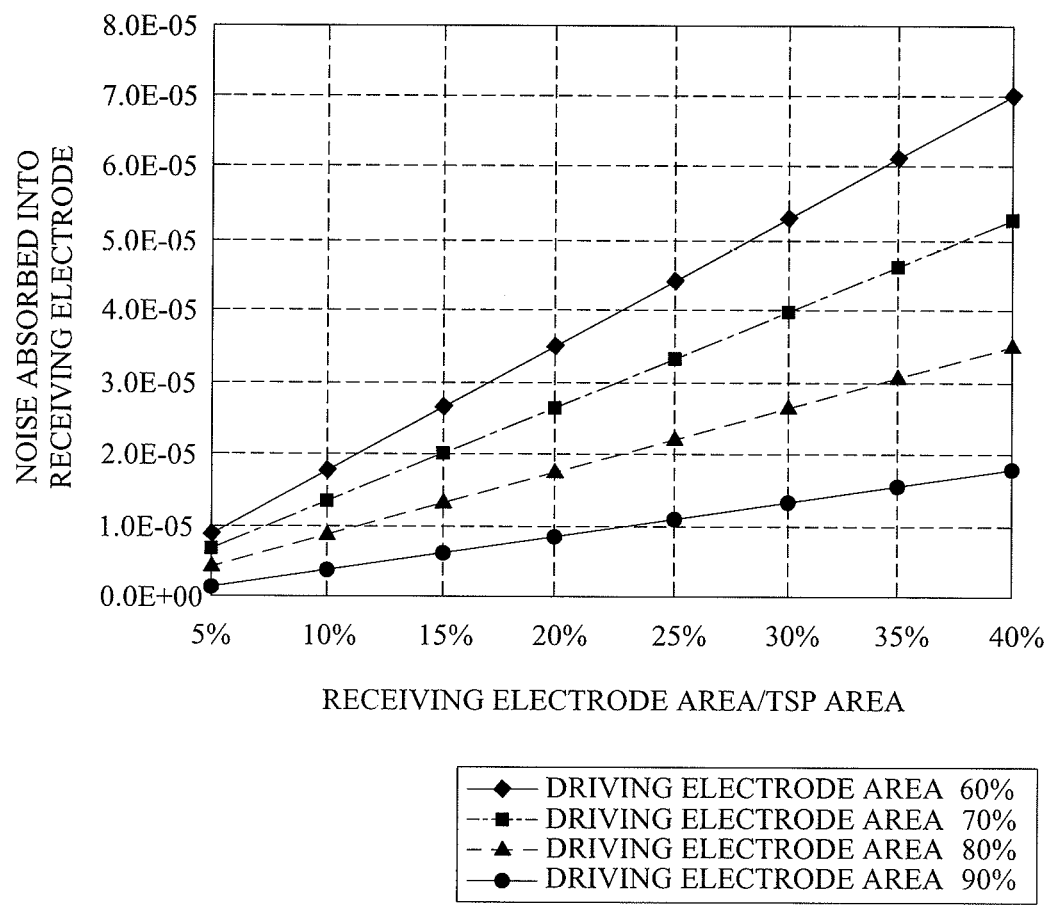
FIG. 14 is a view showing an experiment result of noise applied to a second touch electrode, in an LCD device including a touch screen according to an embodiment of the present invention.

As shown in FIG. 14, it can be seen that most of noise applied to the first touch electrodes (driving electrode) is reflected, and thus, the noise is hardly transferred to the second touch electrodes (sensing electrode).

Figure 15:
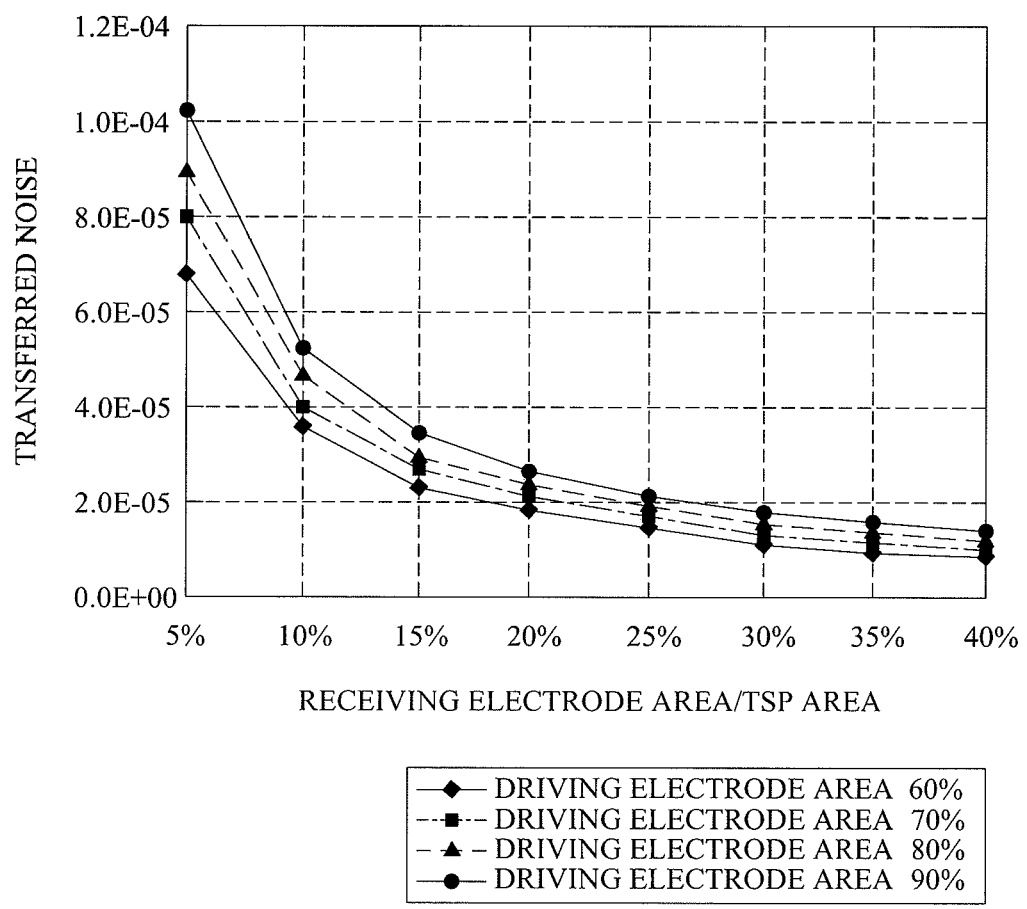
FIG. 15 is a view showing an experiment result of noise which is absorbed into a first touch electrode and then applied to the second touch electrode, in the LCD device including the touch screen according to an embodiment of the present invention.

Moreover, as shown in FIG. 15, it can be seen that the noise is absorbed into the first touch electrodes (driving electrode), and then an amount of noise applied to the second touch electrodes (sensing electrode) is considerably reduced.

Herein, the reflection efficiency of the noise increases in proportion to the area of the first touch electrode that is formed on the upper substrate. Therefore, the influence of the noise decreases on the second touch electrode that is formed at the lower surface of the tempered glass.

The first touch electrodes (driving electrode) may be formed to overlap with about 90% of an entire area of the touch screen panel (TSP). Furthermore, the area of the second touch electrodes (sensing electrode) may be less by 1/20 (5%) than that of the touch screen panel.

In this way, when the first touch electrodes (driving electrode) and the second touch electrodes (sensing electrode) are designed, it can be seen that only 0.0248% of total noise is applied to the second touch electrodes (sensing electrode).

Noise absorbed into the first touch electrode (driving electrode) is filtered by the parasitic capacitance of the first touch electrode and transferred to the second touch electrode (sensing electrode). In this case, a noise transfer gain may be expressed as Equation (1).

$$\frac{1}{\sqrt{1+(2\pi fRC)^2}} \quad (1)$$

Referring to Equation (1), a frequency (f) of noise, a resistance (R) of a touch sensor, and a capacitance (C) of the touch sensor are variables, and the resistance is inversely proportional to the line width of each of the first touch electrode (driving electrode) and second touch electrode (sensing electrode) that are formed of a transparent conductive material.

The capacitance is inversely proportional to a vertical distance (d) (i.e., interval) between the first touch electrode (driving electrode) and second touch electrode (sensing electrode). Also, the capacitance is proportional to the overlapping area of the first touch electrode (driving electrode) and second touch electrode (sensing electrode).

A rate, where noise absorbed into the first touch electrode (driving electrode) is transferred to the second touch electrode (sensing electrode), decreases in inverse proportion to a capacitance that is formed in the first touch electrode (driving electrode).

Herein, total noise transferred to the second touch electrode (sensing electrode) is the sum of noise (which is directly absorbed into the second touch electrode (sensing electrode)) and noise that is absorbed into the first touch electrode (driving electrode) and then transferred to the second touch electrode (sensing electrode).

The first touch electrode (driving electrode) can block noise that has occurred in the liquid crystal panel. Also, a condition can be set for minimizing the sum of noise (which is directly applied to the second touch electrode (sensing electrode)) and noise that is absorbed into the first touch electrode (driving electrode) and then transferred to the second touch electrode (sensing electrode).

Figure 16:
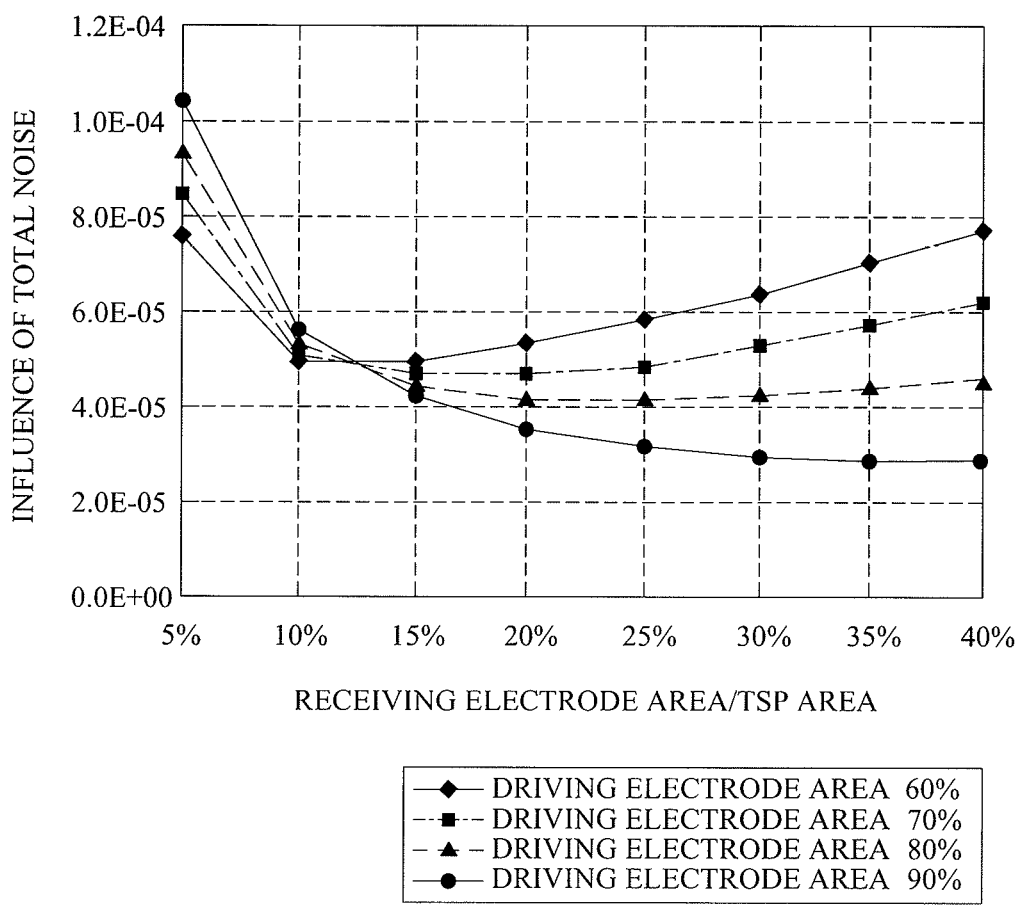
FIG. 16 is a view showing the influence of noise dependent on an area ratio of the first and second touch electrodes, in the LCD device including the touch screen according to an embodiment of the present invention.

In the embodiment, noise that has occurred in the liquid crystal panel is blocked by the first touch electrode (driving electrode), and thus, noise decreases. Accordingly, the optimal condition for minimizing total noise can be set according to the overlapping area of the first touch electrode (driving electrode) and second touch electrode (sensing electrode). That is, as shown in FIGS. 14 to 16, by adjusting an area ratio of the first touch electrode and second touch electrode, noise of the touch screen panel can be reduced.

A relative amount of noise, which is directly applied to the second touch electrode (sensing electrode) by an area ratio of the second touch electrode (sensing electrode) and first touch electrode (driving electrode), decreases as the area of the first touch electrode (driving electrode) becomes broader, but increases as the area of the second touch electrode (sensing electrode) becomes broader.

The influence of noise can be minimized when the first touch electrodes occupy about 70% or more of the entire area of the touch screen panel and the second touch electrodes (sensing electrode) occupy about 15% to about 40% of the entire area of the touch screen panel.

By reflecting the experiment result in the embodiment, the first touch electrodes are formed to have a line width broader by three times to six times than the second touch electrodes, and formed to occupy about 70% to about 90% of the entire area of the liquid crystal panel or touch screen panel.

Moreover, the first touch electrodes formed on the upper substrate are formed to overlap with about 70% to about 90% of the entire area of the second touch electrodes that are formed at the lower surface of the tempered glass. Furthermore, the second touch electrodes are formed to occupy about 5% to about 40% of the entire area of the touch screen panel.

Figure 17:
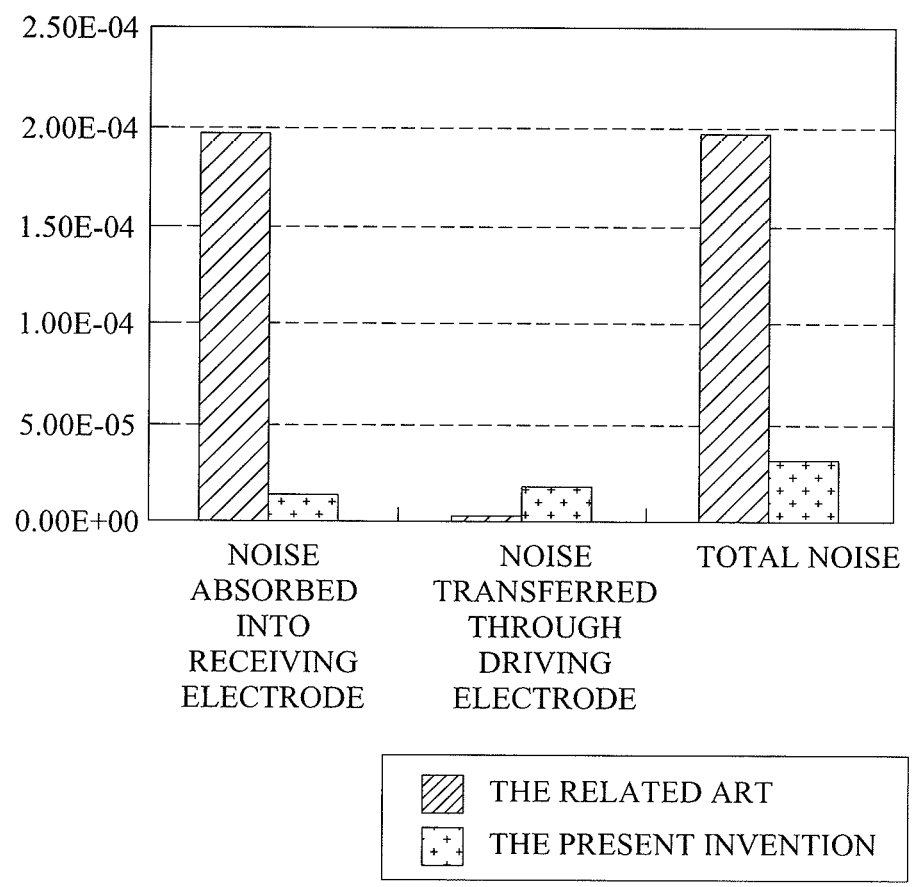
FIG. 17 is a view showing the noise preventing performance of an LCD device including a touch screen according to an embodiment of the present invention, in comparison with the related art.

Referring to FIG. 17, it can be seen that the LCD device including the touch screen according to the embodiments of the present invention decreases an amount of noise (which is applied to the touch screen by driving of the liquid crystal panel) by ⅙, in comparison with the related art LCD device including a touch screen.

As described above, the LCD device including the touch screen according to the embodiments can decrease the influence of noise that is applied to the touch screen by driving of the liquid crystal panel, thus leading to the enhancement of the touch sensing performance.

Moreover, the LCD device according to the embodiments can decrease the influence of noise applied to the touch screen even without adding a separate film or panel, thus enabling the free design of the touch screen.

Moreover, in the embodiments, the thickness of the touch screen can be reduced compared to the related art that separately manufactures a liquid crystal panel and a touch screen and then couples the liquid crystal panel and the touch screen, thus saving the manufacturing cost.

Furthermore, in the embodiments, when the first touch electrode has been formed at the upper polarizing film, a process that forms the electrode pattern of the on-cell touch screen on the liquid crystal panel cannot be performed or can be simplified in manufacturing the LCD device, and thus, the manufacturing efficiency can increase.

In the LCD device including the touch screen according to the embodiments, by reducing the influence of noise due to driving of a screen, the touch sensing performance can be enhanced.

In the LCD device including the touch screen according to the embodiments, the touch sensing performance and the freedom of the design of the touch screen can be enhanced.

In the LCD device including the touch screen according to the embodiments, by enhancing the touch sensing performance, the manufacturing cost can be saved.

In addition to the aforesaid features and effects of the present invention, other features and effects of the present invention can be newly construed from the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A Liquid Crystal Display (LCD) device including a touch screen, the LCD device comprising:
    a liquid crystal panel comprising a lower substrate and an upper substrate;
    a plurality of first touch electrodes formed on the upper substrate for detecting a touch point in a first direction;
    an insulation means formed on the first touch electrodes;
    a tempered glass formed on the insulation means; and
    a plurality of second touch electrodes formed at a lower surface of the tempered glass for detecting a touch point in a second direction,
    wherein the first touch electrodes and the second touch electrodes are separated from each other at certain intervals by the insulation means,
    wherein the first touch electrodes and the second touch electrodes are formed to have a thickness of an integer multiple of 70 nm,
    wherein a magnetic permeability of the first touch electrodes and the second touch electrodes is $1.25*10^{-6}$ H/m,
    wherein, an interval between adjacent first touch electrodes is 0.2 mm, and an interval between adjacent second touch electrodes is 3.8 mm,
    wherein the insulation means is formed to have a thickness of 100 μm to 150 μm,
    wherein the insulation means is an upper polarizing film which is disposed at an upper portion of the liquid crystal panel, and
    wherein a total thickness of both the first and second touch electrodes is less than a thickness of the insulation means being the upper polarizing film.

2. The LCD device of claim 1, wherein the first touch electrodes are formed to have an area broader than the second touch electrodes.

3. The LCD device of claim 1, wherein,
the first touch electrodes are formed in the first direction, and
the second touch electrodes are formed in the second direction perpendicular to the first direction.

4. The LCD device of claim 1, further comprising:
a backlight unit supplying light to the liquid crystal panel; and
a lower polarizing film formed at a lower portion of the liquid crystal panel.

5. The LCD device of claim 1, wherein the first touch electrodes and the second touch electrodes are formed of indium tin oxide (ITO), grapheme, or carbon nano tube.

6. The LCD device of claim 1, wherein the first touch electrodes and the second touch electrodes are formed at 2:1 to 10:1 in line width.

7. The LCD device of claim 1, wherein,
the first touch electrodes are formed to have a line width of 4.4 mm, and
the second touch electrodes are formed to have a line width of 1.0 mm.

8. The LCD device of claim 1, wherein an interval between adjacent first touch electrodes is greater by ten times to thirty times than an interval between adjacent second touch electrodes.

9. The LCD device of claim 1, wherein the first touch electrodes are formed to occupy 70% to 90% of an entire area of a touch screen panel.

10. The LCD device of claim 1, wherein the second touch electrodes are formed to occupy 5% to 40% of an entire area of a touch screen panel.

11. The LCD device of claim 1, wherein the first touch electrodes are formed to overlap with 70% to 90% of an entire area of the second touch electrodes.

12. The LCD device of claim 1, wherein the thickness of the upper polarizing film is about 125 μm.

13. A Liquid Crystal Display (LCD) device including a touch screen, the LCD device comprising:
a liquid crystal panel comprising an upper substrate with a plurality of color filters formed therein, and a lower substrate in which a thin film transistor is formed in each of a plurality of pixels;
a lower polarizing film formed at a lower portion of the liquid crystal panel;
an upper polarizing film formed at an upper portion of the liquid crystal panel;
a plurality of first touch electrodes formed at a lower surface of the upper polarizing film, for detecting a touch point in a first direction;
a tempered glass formed on the upper polarizing film; and
a plurality of second touch electrodes formed at a lower surface of the tempered glass, for detecting a touch point in a second direction,
wherein,
the first touch electrodes and the second touch electrodes are separated from each other at intervals of 100 μm to 150 μm by the upper polarizing film, and
the first touch electrodes are formed to have an area broader than the second touch electrodes,
wherein the first touch electrodes and the second touch electrodes are formed to have a thickness of an integer multiple of 70 nm,
wherein a magnetic permeability of the first touch electrodes and the second touch electrodes is $1.25*10^{-6}$ H/m,
wherein, an interval between adjacent first touch electrodes is 0.2 mm, and an interval between adjacent second touch electrodes is 3.8 mm, and
wherein a total thickness of both the first and second touch electrodes is less than a thickness of an insulation means being the upper polarizing film.

14. The LCD device of claim 13, wherein,
the first touch electrodes are formed to occupy 70% to 90% of an entire area of a touch screen panel, and
the second touch electrodes are formed to occupy 5% to 40% of the entire area of the touch screen panel.

15. The LCD device of claim 13, wherein the thickness of the upper polarizing film is about 125 μm.

* * * * *